United States Patent [19]

Pogonowski et al.

[11] 4,136,008
[45] Jan. 23, 1979

[54] OCEAN OIL SKIMMER FOR CONTINUOUS REMOVAL OF OIL FROM THE OPEN SEA METHOD

[75] Inventors: Ivo C. Pogonowski, Blacksburg, Va.; Joe R. Fowler, Houston, Tex.

[73] Assignee: Texaco Inc., New York, N.Y.

[21] Appl. No.: 552,087

[22] Filed: Feb. 24, 1975

Related U.S. Application Data

[63] Continuation-in-part of Ser. No. 482,289, Jun. 24, 1974, abandoned, which is a continuation-in-part of Ser. No. 346,542, Mar. 30, 1973, abandoned.

[51] Int. Cl.² .............................................. C02B 9/02
[52] U.S. Cl. .............................. 210/83; 210/DIG. 26
[58] Field of Search .................... 210/83, 84, 242 OS, 210/538, 540, DIG. 21, DIG. 26

[56] References Cited

U.S. PATENT DOCUMENTS

| 3,067,877 | 12/1962 | Mobley | 210/83 |
|---|---|---|---|
| 3,532,219 | 10/1972 | Valdespino | 210/242 OS |
| 3,707,232 | 12/1972 | Harrington et al. | 210/242 OS |

Primary Examiner—Charles N. Hart
Assistant Examiner—Ivars Cintins
Attorney, Agent, or Firm—Carl G. Ries; Thomas H. Whaley; Theron H. Nichols

[57] ABSTRACT

A method and three embodiments for continuously removing a film of pollutant, as oil, from floating on the water solely by gravity forces is disclosed. One apparatus comprises a closed top collecting vessel or tank of water elevated above the oil covered water with a large conduit extending from the bottom of the tank down into the oil, so that as the oil continuously and uninterruptedly floats up internally of the conduit and tank to the top of the tank, the water is simultaneously and continuously displaced and sinks down through the tank and conduit to the water below. With a plurality of tanks filled with water mounted not higher than 33 feet on a barge being pulled behind a barrier for gathering and banking up the oil just ahead of the barge, a floating pollutant or oil removal system is formed by extending conduits from the bottoms of the water tanks sloping downwardly over the barrier into the floating oil. After establishing a continuous exchange of the oil for the water in the tank by continuous gravity flow of both the oil and the water through the interconnecting conduit in opposite directions simultaneously, the conduit lower end may then be lowered slightly below the interface between the oil and the water, particularly when inadvertently lowered as the layer of oil becomes thin, for continued replacement of the water in the tank with the oil from below. As the oil rises continuously in the conduits and tanks to the top of the tanks, the water simultaneously and continuously sinks down to the water below to accordingly pick up only pollutants of lower density than water, as oil or oil emulsions to provide maximum oil concentration in the collecting vessel tank. After a tank is full of oil, it is either slid down into the water to be towed or drained into another oil barge pulled behind.

3 Claims, 9 Drawing Figures

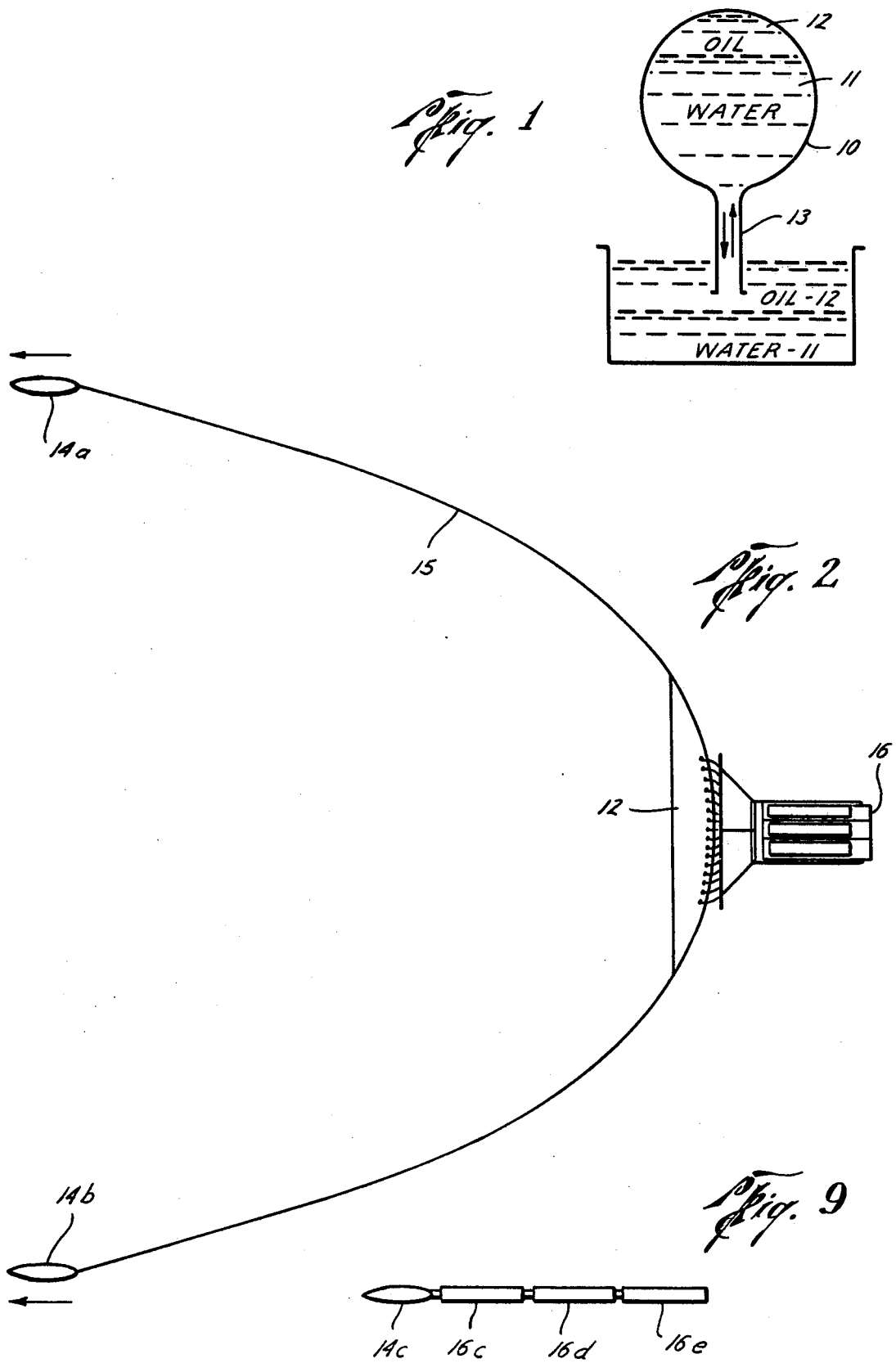

OCEAN OIL SKIMMER FOR CONTINUOUS REMOVAL OF OIL FROM THE OPEN SEA METHOD

BACKGROUND OF THE INVENTION

This invention is a continuation-in-part of the application Ser. No. 482,289 filed June 24, 1974, now abandoned, which was a continuation-in-part of Ser. No. 346,542, filed Mar. 30, 1973, now abandoned.

It is noted that much effort has been directed, and will continue to be directed, toward the avoidance of environmental polluting situations, particularly from oil spillage and inadvertent discharge of other hydrocarbon or petroleum products onto bodies of water. Examplary antipollution devices include among others, means for skimming or removing a non-water soluble, or water immiscible floating layer from the water's surface. In these cases the floating matter is a fluid medium of less density than water, which for convenience will be hereinafter referred to as lighter-than-water pollutant.

A major disadvantage to the known skimming devices is the inability to function continuously and to readily cope with the forces of nature under all circumstances. For example, while most all of the known water skimming devices are found to operate satisfactorily on a relatively smooth water surface, a turbulent condition often precludes efficient operation thereof. In spite of the fact that floating oily liquid has a tendency to calm turbulent waters, the latter might still be quite disturbed. Also, although the surface of the water may be relatively smooth, nonetheless the presence of waves and recurring swells tend to disrupt any stabilized position into which a skimming apparatus might be positioned. Further, in the instance of stormy weather, to be fully effective the skimming device must be adapted to function continuously in waves up to 5 and 6 feet in height.

Further in the petroleum industry, many schemes, devices, and processes have been tested and provided toward efficiently removing the upper floating surface from a body of water upon which an oil slick has been inadvertently formed. Such a slick can result from an uncontrollable flowing well, a ruptured ship, or a damaged storage means which permit the uncontrolled escape of the lighter-than-water petroleum base fluid. The latter, within the meaning of the instant invention can include crude or refined oil, as well as other forms of petroleum products or any pollutants or fluids that have a density of less than that of water.

Likewise the depth of such an oil slick or layer can vary, depending on the rapidity of its deposition on the water's surface, upon the viscosity of the fluid, and upon general weather conditions. In either instance, the layer will tend to spread and form a thinner film, covering however a greater area and thereby becoming a greater polluting threat.

A popular method of cleaning up oil spills subsequent to their occurrence is to attempt to remove or skim the thin upper surface consisting of only the water coating elements, and minimize the amount of water actually removed. It is appreciated however that is virtually impossible to remove a microfilm or a rainbow film of oil from a body of water without simultaneously removing substantial quantities of water itself. Thus, the means normally resorted to is to remove by a skimmer arrangement, a quantity of both the oil and the water, and to thereafter separate the two in a subsequent system. This is apparent in the prior skimming systems disclosed in U.S. Pat. Nos. 2,300,508; 3,565,254; and 3,693,801.

Likewise in the prior skimming systems, large or powerful pumps are required, either directly or through generating a high vacuum to lift the mixture of oil and water off the surface as evidenced by the above three patent disclosures.

In U.S. Pat. No. 3,532,219, an intermittent operating pump is utilized to pump an oil and water mixture into a partially submerged tank from the crest of each wave with the water draining back out after each wave passes, whereby the pumping action provides intermittent flow therein and does not provide continuous, uninterrupted, and simultaneous flow of both the oil and water. A completely closed cycle oil-water tank separation system is disclosed in U.S. Pat. No. 3,067,877, in which the oil-water mixture does not have a horizontal or open and free surface but wherein the oil-water mixture is pumped into the closed tank system for separation of the oil from the water.

OBJECTS OF THE INVENTION

Accordingly, a primary object of this invention is to provide a method for removing a film of pollutant, as oil, from the water and picking up only the materials of lower density than water, as only oil or oil emulsion, to provide a maximum oil concentration in the collecting vessel without requiring subsequent separation of water from the pollutant.

Another primary object of this invention is to provide a gravity exchange method of raising a lighter-than-water polluting medium from the water surface to an elevated tank continuously, uninterruptedly, and with no pump until either the collecting vessel is filled or all of the polluting medium is removed.

A further object of this invention is to provide a method employing a few apparatuses, some being deliverable by air, for removing a lighter-than-water pollutant or medium from the surface of the water.

A still further object of this invention is to provide a method employing lighter-than-water pollutant removal apparatuses that are easy to operate, are of simple configuration, are economical to build and assemble, and are of greater efficiency for picking up only the pollutant with no water therewith.

Other objects and various advantages of the disclosed methods and pollutant removal systems for practicing the methods will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, a few forms or mechanisms to practice the methods of the invention wherein like reference numerals have been employed to indicate similar parts in the several views in which:

FIG. 1 is a schematic vertical sectional view of one basic embodiment of the invention with all supporting structure removed;

FIG. 2 is a schematic plan view of a second embodiment of the invention;

FIG. 9 is a schematic plan view of a tug boat pulling a train of tanks of pollutant to be emptied and returned for refilling.

DESCRIPTION OF THE INVENTION

Figure 3:
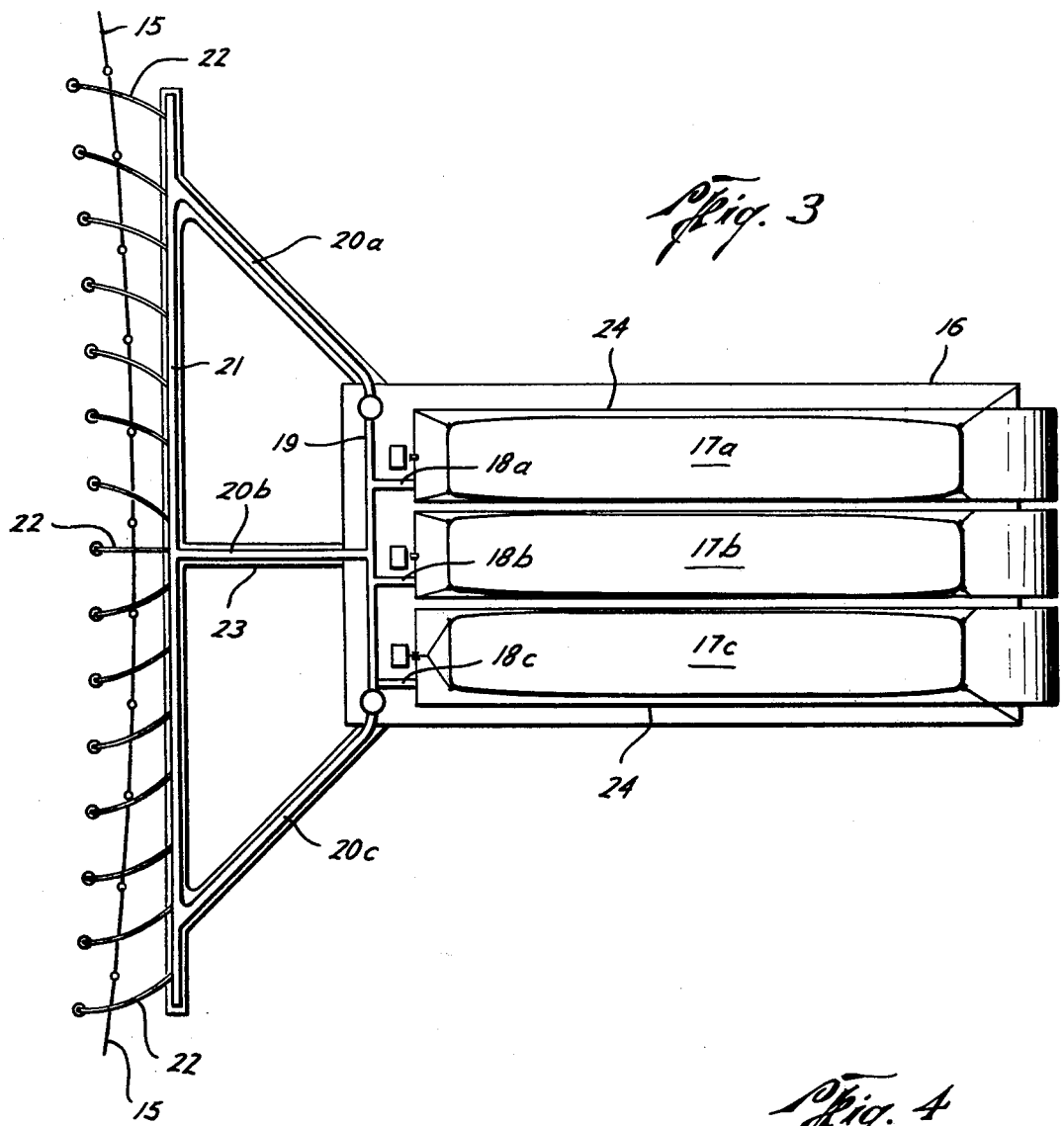
FIG. 3 is a schematic enlarged detailed view of a portion of FIG. 2.

The invention disclosed herein, the scope of which being defined in the appended claims, is not limited in its application to the details of construction and arrangement of parts shown and described for practicing the disclosed methods, since the invention comprises other methods and is capable of providing other embodiments for being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for picking up lighter-than-water pollutants from the water surface and a few apparatuses for practicing the disclosed methods or other methods.

The basic method of the invention for removing a lighter-than-water polluting medium from the surface of a body of water comprises the steps of:

(1) filling a tank elevated over the lighter-than-water pollutant with water, and (2) exchanging the water in the tank for the lighter-than-water pollutant from below by continuous, simultaneous, uninterrupted, and opposite gravity flow of both the pollutant and the tank water.

Another method comprises expanding the first step of the first method above into the following steps, (1) submerging a lower end of an upwardly extending conduit beneath the surface of the floating lighter-than-water polluting medium, and (2) connecting the upper end of the upwardly extending conduit to an elevated tank of water whereby the lighter-than-water polluting medium will float to the top of the water tank to continuously displace the water therein due to gravity forces of the heavier water.

Another method comprises expanding the last step of the first method into, (2) passing the water downwardly through a conduit into the lighter-than-water medium, and (3) simultaneously and continuously passing the lighter-than-water medium or pollutant up through the conduit to the top of the tank for replacing the heavier water in the tank with the lighter floating medium which may be referred to as gravity flow of both the pollutant and the tank water.

A method for removing a thin film of lighter-than-water polluting medium from floating on a water surface comprises the steps of, (1) moving an elongated barrier through the polluted water for scooping the pollutant up against one side of the barrier, (2) filling an elevated closed top container with water, (3) connecting the lowest portion of the elevated container with the upper end of a downwardly sloping conduit, and (4) submerging the lower end of the downwardly sloping conduit in the scooped up floating pollutant whereby as the lighter floating polluting medium under the lower end of the downwardly sloping conduit floats up the sloping conduit and up to the top of the elevated container it displaces the water in the container continuously for simultaneously causing the water in the container by gravity forces to accordingly flow continuously down and out below the polluting medium.

A further method similar to the first method set forth above includes expanding the second step to the following, (2) interconnecting the tank of water with the lighter-than-water medium and exchanging the lighter-than-water medium for the water in the tank by gravity flow of both the medium and the water through the interconnection in opposite directions.

Still another modification of the above described basic method comprises the following two steps, (1) establishing fluid exchange flow of the lighter-than-water polluting medium continuously rising upwardly through the conduit extending from within the polluting medium and above the interface between the polluting medium and the water to the top of the tank while the water continuously and uninterruptedly sinks downwardly out of the tank and conduit, and (2) lowering the conduit to extend slightly below the interface for co ntinued replacement of the water in the tank with the lighter-than-water polluting medium from below.

DESCRIPTION OF POLLUTANT COLLECTION SYSTEM

FIG. 1, which is a schematic vertical sectional view of one basic embodiment of the invention, illustrates the basic embodiment with all supporting structure removed for clarity of disclosure. A closed tank 10 of water is illustrated supported high above an open body of water 11 having a horizontal or open and free surface, as the ocean, lake, or open sea below having an oil slick or layer of oil 12 thereon. The water tank is sealed closed at the top and has only an opening at the bottom. An elongated conduit 13 extends from the lowest portion of the tank down to and protruding under the open surface of the pollutant, as oil, as illustrated.

In operation, as the oil in and around the mouth of conduit 13 rises in the water filled elongated tube, it continues upwardly to the top of the water tank 10 where an equal amount or volume of water sinks continuously downwardly through the tank and elongated conduit to emerge from under the layer of pollutant oil on the ocean below. More specifically, just as soon as the lower opening of conduit 13, FIG. 1, is placed in the body of oil 12, the open water 11 in the tank 10 begins to sink through the oil. This phenomenon is deemed to occur because while the density or weight of water is about 62 pounds per cubic foot, the weight of oil is approximately 50 pounds per cubic foot. As the water sinks out of the tanks and down through the oil, an equal volume of the oil simultaneously and continuously flows up and replaces the water in the tank. The water appears to channel through the oil as the exchange takes place. No mechanical pumps or moving parts are required or utilized to complete the exchange. Thus, as the lighter oil or pollutant moves upwardly through the conduit and through the water tank to the top thereof, a continuous stream of an equal amount of water accordingly simultaneously, uninterruptedly, and continuously moves downwardly through the tank down through the conduit to the ocean of water below which is referred to as gravity flow of both the pollutant and the tank water. This exchange of polluting oil for ocean water will continue until either of two things happen. Either (1) all the pollutant or oil is collected from off the surface of the water, or (2) all water in the tank has been replaced with oil. This apparatus will operate as long as the distance from the top of the polluting surface to the top of the tank is not greater than 33 feet, preferably 30 feet, and the top of the tank is maintained sealed. A valve may be inserted in the top of the tank for venting all air during refilling with water, if desired.

FIG. 2, a schematic plan view of the second embodiment of the invention, illustrates a collection system for picking up a thin film of oil or rainbow film on the open water or ocean surface. This system comprises two tug boats, 14a, 14b, at each end of an elongated flexible barrier 15 which floats only a few feet below the surface of the water and is weighted to extend sufficiently above the water so that as the tug boats pull the barrier, it will assume a parabolic shape, collecting all of the oil 12 therein and stacking it or piling it up against the barrier at the rearward vertex thereof. Closely behind the vertex of the barrier is maintained a barge 16a which is either self-propelled to maintain it adjacent to the barrier or else it may be pulled by the barrier.

Figure 4:
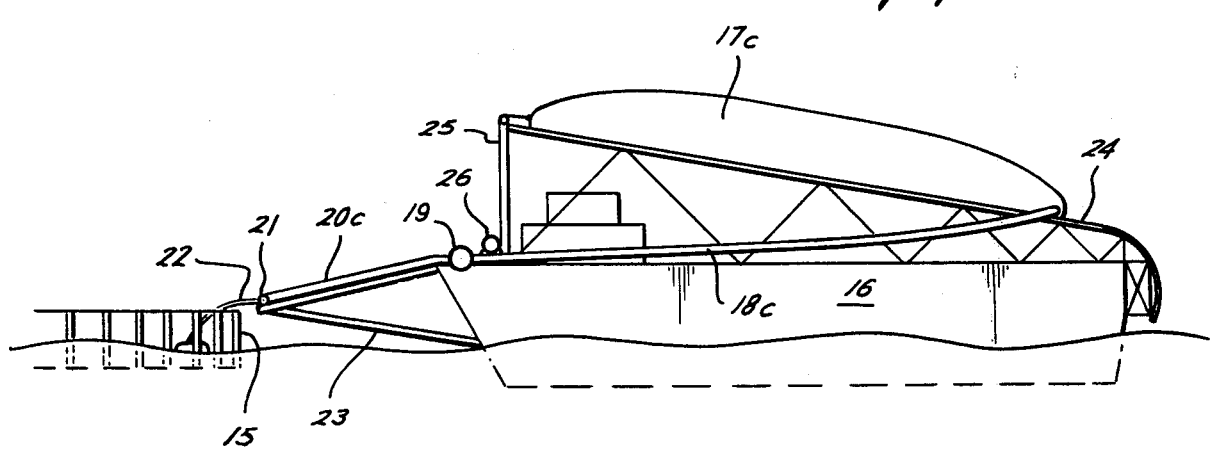
FIG. 4 is a schematic side view of the apparatus of FIG. 3.

FIGS. 3 and 4, schematic orthogonal enlarged detailed views of a portion of the embodiment of FIG. 2, illustrate three tanks, 17a, 17b, and 17c, FIG. 3, mounted at a suitable height above the deck of the barge 16a and not over 33 feet above the surface of the water, each tank having interconnected downwardly sloping conduits 18a, 18b, and 18c extending forwardly to a first transverse conduit 19, and three additional conduits 20a, 20b, and 20c which extend forwardly to a second and longer transverse conduit 21. This second transverse conduit 21, FIGS. 3 and 4, has a multiplicity of forwardly extending conduits 22 extending over the barrier 15 down and into the oil puddle 12 which is banked up in the vertex of the barrier. A suitable support 23 is mounted on the bow of the boat 16 for supporting the conduits to maintain the constant slope therein.

As seen in FIG. 4, which figure is a schematic side view of the apparatus of FIG. 3, a main feature of the invention is illustrated which is the continual upward slope of the conduits from the water surface to the lowest portion of the tank. Likewise the tanks are illustrated as mounted on rollers (not shown) in an inclined slope or track 24. The tank is held in the raised position with a line or cable 25 passing over a pulley downwardly to a winch 26 fixedly attached to the deck of the ship.

Thus, with the floating inlet of each of the plurality of conduits extending down through the surface of the pollutant oil on the surface of the water, the oil will then rise through the upward slanting conduits up to the lowest end of the tank where there the oil will rise in the sloping tank to the top thereof and an equal amount of water is displaced which flows downwardly for the full length of the tank down through the sloping conduits and down through the pollutant back into the water.

When a tank is full, the conduit is disconnected therefrom and the winch allows the tank to roll down the incline into the water and is pulled behind or connected to other tanks floating behind the barge. When several tanks are connected, they may be connected behind a tugboat 14c as illustrated in FIG. 9 and the loaded barges 16c, 16d, and 16e taken away, emptied, and brought back and refilled. Air vent valves may be added to the top of the tanks to facilitate filling with water if so desired.

Next, either a tank of water is pulled up the incline to the top position illustrated in FIG. 4 or an empty tank is pulled up and filled with water in the upper elevated position illustrated. The sloping conduits are then connected thereto for exchanging more polluting oil for the water in the tank. An important feature is that only the lighter-than-water pollutant or oil flows up into the tank.

Figure 5:
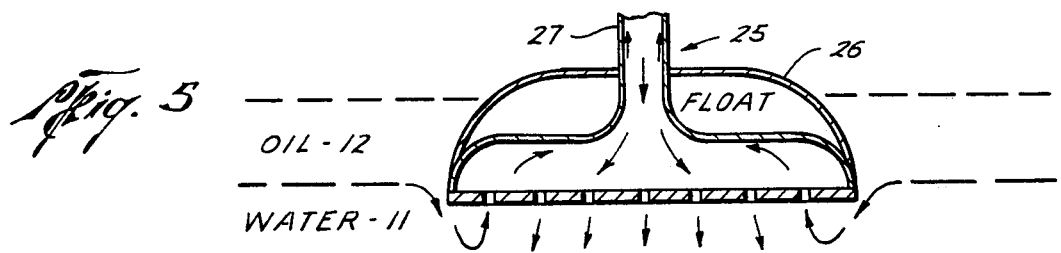
FIG. 5 is a schematic detailed vertical sectional view of a floating oil intake.

FIG. 5 illustrates details of a floating oil inlet 25. While the floating inlet is illustrated as being positioned deep in a thick layer of oil 12 on the surface of the water 11, floats 26 may be varied in shape to cause the floating inlet to ride at a shallower depth as is the usual situation as illustrated in FIG. 1. However, after operating in the position of FIG. 1, wherein a current of upwardly flowing pollutant and downwardly flowing water is established by the simultaneous and continuous gravity flow exchange of the two fluids, and the layer of oil 12 has become thinner as it rises into the elevated storage tank, by inadvertence the bottom of the float may extend slightly below the bottom of the layer of oil as FIG. 5 illustrates. In such event, it was discovered as the water passes down the inclined slope passage 27 and out the inner holes in the bottom of the float, that the outer holes of the float will pass or let oil flow in. Apparently this is due to the fact that vortex currents or eddy currents are set up due to the water moving out of the float downwardly and outwardly causing a whirling or eddy current which draws the oil into the outer holes of the float, which oil once inside the float will float upwardly through the conduit to the tank above and maintain the gravity flow exchange of the two fluids during the period of time when the float extended slightly below the layer of oil. Thus very thin layers of oil can be drawn up into the floating inlet 25.

Figure 6:
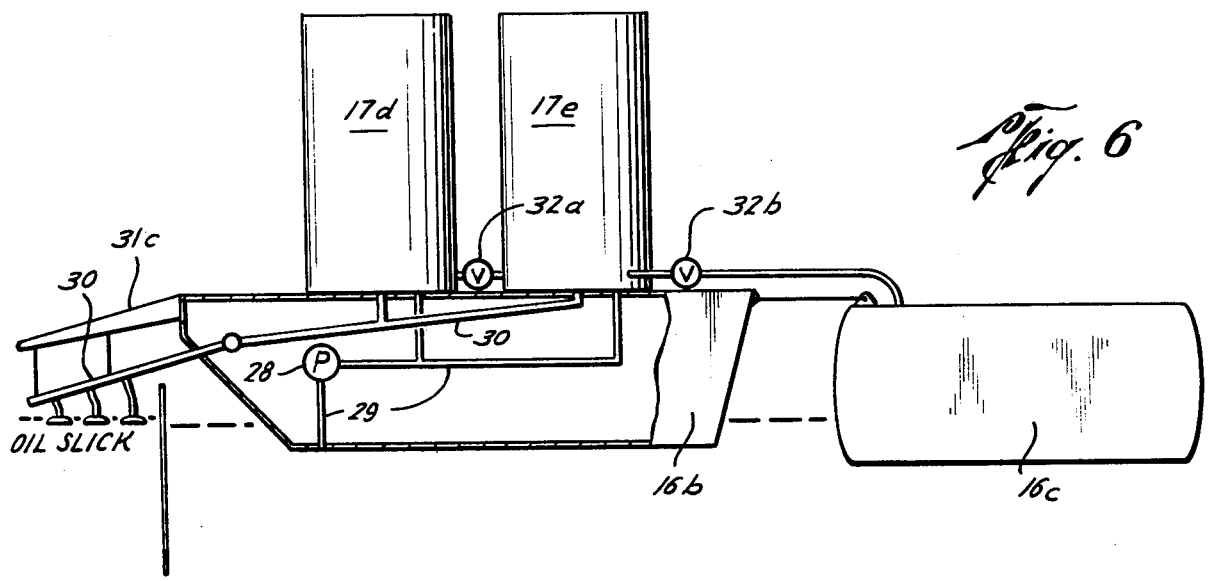
FIG. 6 is a schematic side view of a third embodiment of the invention with parts in section.

FIG. 6, a schematic side view of a third embodiment of the invention, with parts in section, illustrates a barge 16b with two tanks 17d, 17e in tandem mounted on the upper surface thereof with the top of the tank being designed to be not over 33 feet above the surface of the water. These two tanks 17d and 17e have a pump 28 and lines 29 extending from the bottom of the barge to the bottom of the tanks for filling thereof with water. Slanting downwardly from the bottom of each of the tanks are conduits 30 which extend down and forwardly from the front of the barge. At the front or bow of the barge, the conduits are supported by arms 31a, 31b, 31c, as shown in FIG. 7, a top view of the embodiment of FIG. 6.

Figure 7:
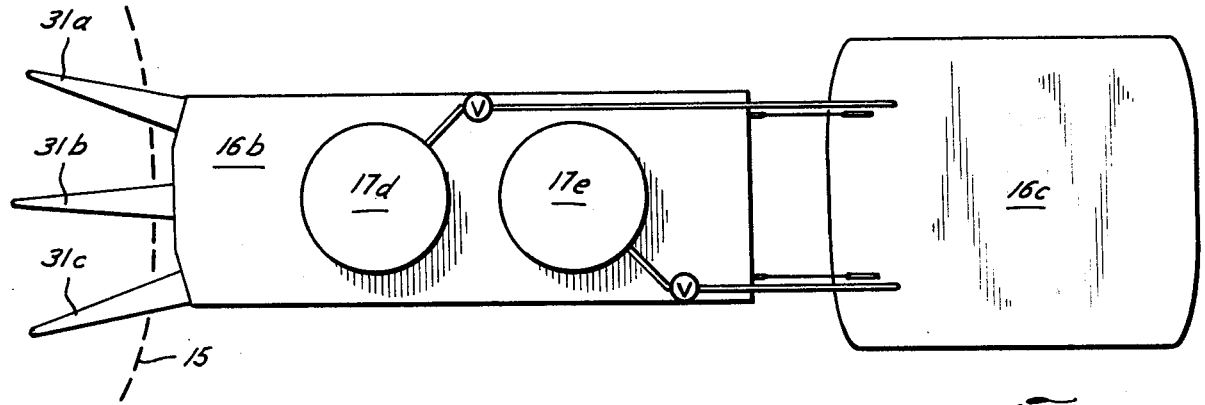
FIG. 7 is a schematic top view of the modification of FIG. 6.
Figure 8:
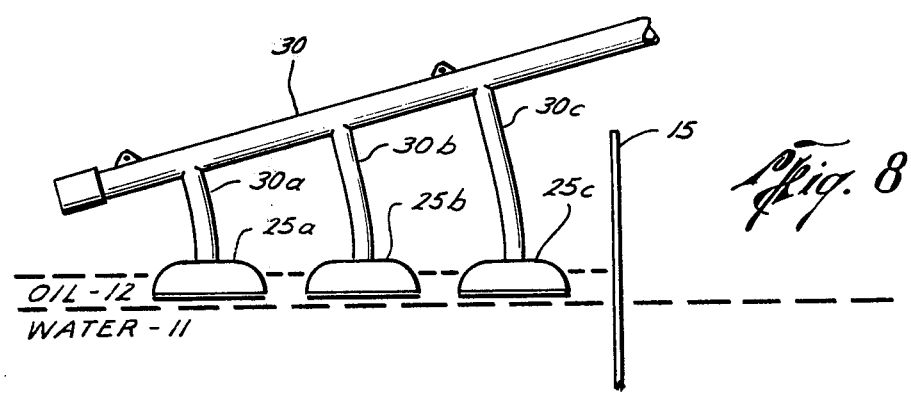
FIG. 8 is a schematic enlarged detailed side view of the floating oil intakes on one line supported by a boom of the embodiment of FIG. 6.

As illustrated in FIG. 8, which is a schematic detailed side view of the floating oil intakes 25a, 25b, 25c on one line 30 for being supported by the boom 31c, FIG. 7. At the lower ends of the line 30 are a plurality of downwardly extending conduits 30a, 30b, 30c each terminating in a floating inlet 25a, 25b, 25c which floating inlets are illustrated floating in the oily pollutant 12 or lighter-than-water pollutant banked up against the barrier 15.

In operation, as the pollutant floats up internally of the floating inlet, it floats up in the upwardly extending conduits 30a, 30b, 30c to the main conduit 30 and from there, as shown in FIG. 6, the upwardly sloping conduit 30 allows the oil to rise up to the bottom of each of the tanks. From there, the oil rises to the top of the tank wherein an equal amount of water is displaced from the tank and which water sinks or flows down the conduits and out the float into the water below the floating pollutant which may be referred to as gravity flow of both the pollutant and the tank water. While only three supporting arms are illustrated on the bow of the barge for supporting the floats ahead of the barrier, more or less than three other supporting arms and groups of floating inlets may be utilized. After the tanks of this embodiment are full of oil, valves 32a, 32b may be opened for draining the oil from the tanks to a floating barge 16c pulled behind. Likewise, vent valves (not shown) in the top of the tanks may be opened to accelerate this draining of the oil from the tanks and these valves may also be left open while the water pump 28 completely refills the tanks with water prior to closing of the vent valves on the tops of the tanks. With the tanks full of water, and with the floating inlets extending down into any polluting lighter-than-water medium, this medium will immediately start to rise up into the tanks to displace heavier water therein which sinks out of the tanks.

It has been found that a speed of between one-half knot and one knot is adequate and should not be exceeded for banking the polluting medium or oil on the surface of the water up against the barrier for collection in these systems.

A feature of this embodiment, likewise, of the water-oil gravity exchange or gravity flow invention is that only oil or oil-water emulsion or other lighter-than-water mediums will rise in the floating inlets and pass up through the conduits and tanks. No water other than water which is warmer than that in the tank will rise up into this system and therefore the tanks will fill with nothing but pollutant therein, i.e., oil, or oil emulsions.

Another feature of this invention is the ease and quickness of raising the lighter-than-water pollutant, as oil, up into a tank 30 to 33 feet above the surface of the water with the disclosed continuous and uninterrupted gravity exchange going on between the oil and the water as compared to a pumping system with intermittent flow as disclosed in U.S. Pat. No. 3,532,219, described above.

Obviously, other methods may be utilized in the operation of the embodiments disclosed above and likewise other embodiments may be utilized for carrying out or practicing the methods described above.

Accordingly, it will be seen that the above described methods for removing a film of lighter-than-water pollutant, as oil, from the water surface and picking up only the materials of lower density than water, as oil or oil emulsion, and various collecting systems are set forth above which will operate in a manner which meets each of the objects set forth hereinbefore.

While only a few methods of the invention and three mechanisms for practicing the methods have been disclosed, it will be evident that various other methods and modifications are possible in the arrangement and construction of the disclosed invention without departing from the scope of the invention and it is accordingly desired to comprehend within the purview of this invention such modifications as may be considered to fall within the scope of the appended claims.

We claim:

1. A method for continuously removing a lighter-than-water medium from floating on a water surface comprising the steps of,
    (a) filling a tank with water,
    (b) positioning the tank at an elevation greater than the lighter-than-water medium,
    (c) interconnecting the tank of water with the lighter-than-water medium by extending a conduit from the bottom of the elevated full tank of water down into the polluting medium above the interface between the polluting medium and the water,
    (d) establishing a continuous exchange of the lighter-than-water medium for the water in the tank by continuous gravity flow of both of the medium and the water through the interconnection in opposite directions simultaneously, and
    (e) lowering the conduit lower end to slightly below the interface for continued replacement of the water in the tank with the lighter-than-water polluting medium from below.

2. A method for continuously filling an elevated tank with a lighter-than-water polluting medium floating as a layer on a water surface below the level of the tank comprising the steps of,
    (a) positioning a tank full of water completely above the surface of the layer of lighter-than-water polluting medium,
    (b) extending a conduit from the bottom of the elevated full tank of water down into the layer of the floating lighter-than-water polluting medium and above the interface between the layer of polluting medium and the water thereunder,
    (c) causing the lighter-than-water polluting medium to continuously float upwardly through the conduit to the top of the tank and causing the heavier water to continuously sink downwardly out of the tank and the conduit for replacing the water in the tank with the lighter floating polluting medium, and
    (d) lowering the conduit to extend slightly below the interface for continued replacement of the water in the tank with the layer of lighter-than-water polluting medium from below.

3. A method for continuously filling an elevated tank with a lighter-than-water polluting medium floating as a layer on a water surface below the level of the tank comprising the steps of,
    (a) positioning a tank full of water completely above the surface of the layer of lighter-than-water polluting medium,
    (b) extending a conduit from the bottom of the elevated full tank of water down into the layer of polluting medium above the interface between the polluting medium and the water,
    (c) establishing fluid exchange flow of the layer of lighter-than-water polluting medium continuously rising upwardly through the conduit to the top of the tank while the water continuously sinks downwardly out of the tank and conduit, and
    (d) lowering the conduit lower end to slightly below the interface for continued replacement of the water in the tank with the layer of lighter-than-water polluting medium from below.

* * * * *